United States Patent
Benedetto

(10) Patent No.: US 10,341,723 B2
(45) Date of Patent: Jul. 2, 2019

(54) IDENTIFICATION AND INSTANTIATION OF COMMUNITY DRIVEN CONTENT

(71) Applicant: Sony Interactive Entertainment LLC, San Mateo, CA (US)

(72) Inventor: Warren Benedetto, Aliso Viejo, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 0 days.

(21) Appl. No.: 15/456,224

(22) Filed: Mar. 10, 2017

(65) Prior Publication Data

US 2018/0262803 A1    Sep. 13, 2018

(51) Int. Cl.
G06K 9/00       (2006.01)
H04N 21/442     (2011.01)
H04N 21/466     (2011.01)
H04N 21/4786    (2011.01)
H04N 21/4788    (2011.01)

(52) U.S. Cl.
CPC . *H04N 21/44204* (2013.01); *H04N 21/44218* (2013.01); *H04N 21/4667* (2013.01); *H04N 21/4786* (2013.01); *H04N 21/4788* (2013.01); *G06K 9/00221* (2013.01); *G06K 9/00335* (2013.01); *G06K 9/00362* (2013.01)

(58) Field of Classification Search
None
See application file for complete search history.

(56) References Cited

U.S. PATENT DOCUMENTS

2009/0197681 A1    8/2009   Krishnamoorthy et al.
2012/0290950 A1*  11/2012   Rapaport ............... H04L 51/32
                                                  715/753

(Continued)

FOREIGN PATENT DOCUMENTS

WO    WO 2018/165523    9/2018

OTHER PUBLICATIONS

Leite et al.; "Comparing Models of Disengagement in Individual and Group Interactions", In: Proceedings of the Tenth Annual ACM/IEEE International Conference on Human-Robot Interaction. Mar. 5, 2015, Retrieved from <https://robotshelpingkids.yale.edu/sites/default/files/files/LeiteEtAl_HRI2015_ModelsOfDisengagement.pdf>.

(Continued)

*Primary Examiner* — James R Marandi
(74) *Attorney, Agent, or Firm* — Polsinelli LLP

(57) ABSTRACT

An apparatus for providing community driven content includes at least one sensor for recording sensor data, a network interface, a memory, and a processor connected to the sensor, the network interface, and the memory. The processor is configured to record usage history for engagement with the apparatus by a first user over a period of time and receive the sensor data from the at least one sensor for actions by the first user over the period of time. The processor determines user preferences for the first user based on the usage history and the sensor data, and determines whether a second user is available for interaction with the first user. The processor then outputs the suggested action, at a predetermined time, to at least one connected display device or audio device.

12 Claims, 5 Drawing Sheets

(56) References Cited

U.S. PATENT DOCUMENTS

| | | |
|---|---|---|
| 2013/0295956 A1* | 11/2013 | Ding .................... H04W 4/025 455/456.1 |
| 2013/0316836 A1* | 11/2013 | Vogel ................. G07F 17/3272 463/43 |
| 2014/0222806 A1 | 8/2014 | Carbonell et al. |
| 2014/0280296 A1 | 9/2014 | Johnston et al. |
| 2015/0234939 A1 | 8/2015 | Aharony et al. |
| 2017/0031575 A1 | 2/2017 | Dodtan-Cohen et al. |
| 2017/0048568 A1 | 2/2017 | Filev et al. |
| 2017/0053157 A1 | 2/2017 | Bedrosian et al. |

OTHER PUBLICATIONS

PCT Application No. PCT/US2018/021699 International Search Report and Written Opinion dated May 15, 2018.

* cited by examiner

IDENTIFICATION AND INSTANTIATION OF COMMUNITY DRIVEN CONTENT

BACKGROUND OF THE INVENTION

Field of the Invention

This application relates to home entertainment devices, and more particularly to a system and method for identification and instantiation of community driven content.

Description of the Related Art

Digital content distribution systems conventionally include a content server, a content player, and a communications network connecting the content server to the content player. The content server is configured to store digital content files, which can be downloaded from the content server to the content player. Each digital content file corresponds to a specific identifying title. The digital content file typically includes sequential content data, organized according to playback chronology, and may comprise audio data, video data, or a combination thereof.

The content player is configured to download and play a digital content file, in response to a user request selecting the title for playback. The user is typically presented with a set of recommended titles for selection. Such recommendations are based primarily on previous operations and/or selections performed by the user.

A streaming media service generally includes a content server, a content player, and a communications network connecting the content server to the content player. The content server is configured to store (or provide access to) media content made available to end users. Media content may include, movies, videos, music, games, social applications, etc.

To locate content, a user may perform a search of media content available on the content server. In response to receiving a search query, the content server may determine a collection of media content relevant to the search query and serve to the client device a page containing links which can be selected to access one or more of the media content. One approach for generating search results is to rank media content based on exact and fuzzy matches of user-entered query text with the text of titles, synopses, cast, etc. of media content. However, this approach often provides unsatisfactory results.

SUMMARY OF THE PRESENTLY CLAIMED INVENTION

The following presents a simplified summary of one or more embodiments in order to provide a basic understanding of present technology. This summary is not an extensive overview of all contemplated embodiments of the present technology, and is intended to neither identify key or critical elements of all examples nor delineate the scope of any or all aspects of the present technology. Its sole purpose is to present some concepts of one or more examples in a simplified form as a prelude to the more detailed description that is presented later. In accordance with one or more aspects of the examples described herein, systems and methods are provided for providing community driven content.

In an aspect, an apparatus for providing community driven content includes at least one sensor for recording sensor data, a network interface, a memory, and a processor connected to the sensor, the network interface, and the memory. The processor is configured to record usage history for engagement with the apparatus by a first user over a period of time and receive the sensor data from the at least one sensor for actions by the first user over the period of time. The processor determines whether a second user is available for interaction with the first user and determines a suggested action for continued engagement with the apparatus based on the user preferences for the first user and the availability of the second user. The processor then outputs the suggested action, at a predetermined time, to at least one connected display device or audio device.

In a second aspect, a method for providing community driven content by a home entertainment system includes recording usage history for engagement with the home entertainment system by a first user over a period of time, and receiving the sensor data from the at least one sensor for actions by the first user over the period of time. The home entertainment system determines whether a second user is available for interaction with the first user and determines a suggested action for continued engagement with the apparatus based on the user preferences for the first user and the availability of the second user. The home entertainment system then outputs the suggested action, at a predetermined time, to at least one connected display device or audio device.

BRIEF DESCRIPTION OF THE DRAWINGS

These and other sample aspects of the present technology will be described in the detailed description and the appended claims that follow, and in the accompanying drawings, wherein:

DETAILED DESCRIPTION

The subject disclosure provides techniques for identification and instantiation of community driven content, in accordance with the subject technology. Various aspects of the present technology are described with reference to the drawings. In the following description, for purposes of explanation, numerous specific details are set forth in order to provide a thorough understanding of one or more aspects. It can be evident, however, that the present technology can be practiced without these specific details. In other instances, well-known structures and devices are shown in block diagram form in order to facilitate describing these aspects. The word "exemplary" is used herein to mean "serving as an example, instance, or illustration." Any embodiment described herein as "exemplary" is not necessarily to be construed as preferred or advantageous over other embodiments.

A streaming media service generally includes a content server, a content player, and a communications network connecting the content server to the content player. The content server is configured to store (or provide access to) media content made available to end users. Media content may include, movies, videos, music, games, social applications, etc. The content player can suggest media content to one or more users based on the interests of the users. The content player can also suggest media content to be viewed or played together with other users connected online as a social experience. Such interests may be determined by the viewing or search history of the users.

The present technology provides the improved media content suggestions that encourage more user engagement by finely tailoring the media content suggestions to users. Sensors provide sensor data on user actions, schedules, and moods. User preferences are generated based on the sensor data. The content player then offers media content suggestions based on the user preferences.

Figure 1:
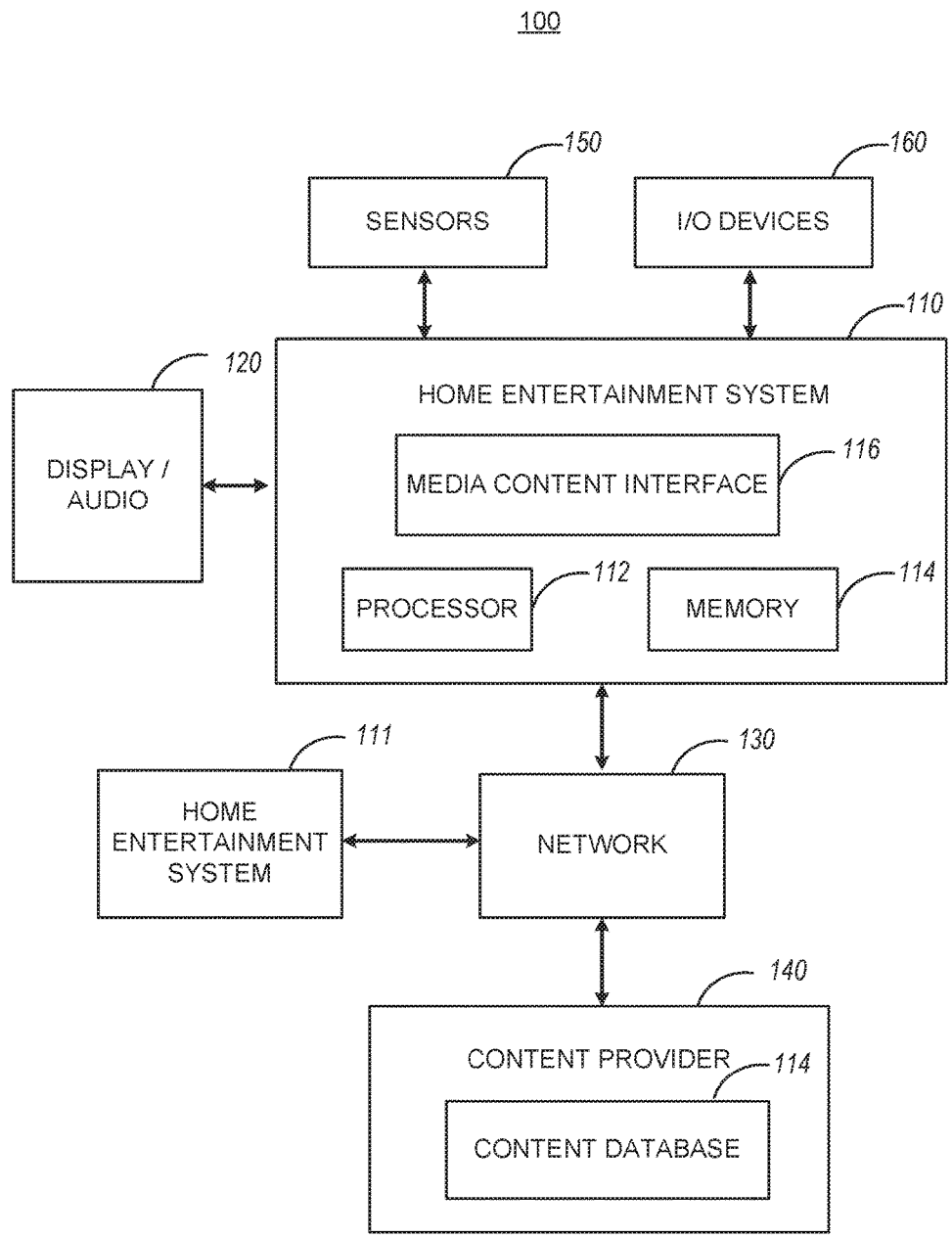
FIG. 1 illustrates a block diagram of an example infrastructure 100 for providing community driven content by a home entertainment system, according to one implementation of the invention.

FIG. 1 illustrates a block diagram of an example infrastructure 100 for providing community driven content by a home entertainment system 110, according to one implementation of the invention. As shown, the infrastructure 100 includes a content provider 140 and at least one home entertainment system 110, 111, each connected to a network 120.

In an example implementation, one or more home entertainment systems 110, 111 are located in each residential home or small business, while the content provider 140 exists across one or more data centers. A data center is a facility used to house computer systems and associated components, such as powerful data processing, telecommunications, and storage systems.

The network 120 can include a wide area network (WAN) such as the Internet, or a local area network (LAN). The network 101 can include an intranet, a storage area network (SAN), a personal area network (PAN), a metropolitan area network (MAN), a wireless local area network (WLAN), a virtual private network (VPN), a cellular or other mobile communication network, a wireless local area networking (WiFi) network, a BLUETOOTH® wireless technology connection, a near field communication (NFC) connection, any combination thereof, and any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

The home entertainment systems 110, 111 connect to the content provider 140 and to each other through the network 101 via one or more Internet Service Providers (ISPs). An ISP is an organization that provides services for accessing and using the Internet. Internet Service Providers may be organized in various forms, such as commercial, community-owned, non-profit, or otherwise privately owned. Internet services typically provided by ISPs include Internet access, Internet transit, domain name registration, web hosting, Usenet service, and colocation. Each ISP typically serves large groups of Internet users in a geographic area.

The home entertainment system 110 communicates with the content provider 140 over the network 120 to obtain media content (e.g., movies, videos, music, games, social applications, etc.). The home entertainment system 110 includes at least a processor 112 and a memory 114 for storing data. In this particular example, the home entertainment system 110 represents a processing device running a media content interface 116.

The media content interface 116 is configured to obtain media content from the content provider 140, rendered on a display 120 (e.g., a tablet, a smartphone, a monitor, a television, and/or a head-mounted display (HMD) for virtual reality (VR) or augmented reality (AR). The display 120 can additionally or alternatively include an audio output device such as a multimedia sound system or integrated speakers for outputting audio content.

The home entertainment system 110 represents a set-top device connected to both the network 120 and the display 140 (e.g., a flat-panel television). Accordingly, home entertainment system 110 is representative of digital cable boxes, digital video recorder (DVR) systems, video game consoles, and other media devices capable of connecting to a network 120 and receiving and playing back media streams provided by content provider 140. In such a case, the disc player could connect to the content provider 140 and download interface components used to select and playback media streams. Further, the display 140 may itself be an integrated device capable of connecting to the network 120 playing back media streams supplied by the content provider 140. For example, some television displays include integrated components used to connect to a streaming media service, video on demand services, or video sharing websites. The disclosure below in reference to FIG. 3 describes in more detail an example home entertainment system 110.

One or more input/output (I/O) devices 160 are connected (e.g., via wired cable or wireless connection such as WiFi or BLUETOOTH®) to or integrate into the he home entertainment system 110. The I/O devices 160 can include, for example, a keyboard, a mouse, a remote control, a controller, a microphone, a television, a head mounted display (HMD), and/or a monitor, etc.

One or more sensors 150 devices 160 are connected to or integrate into the home entertainment system 110. The sensors 150 function to collect data on the whereabouts and actions of one or more users in a vicinity of the home entertainment device 110. The sensors 150 can include, for example, cameras, microphones, radars, Light Detection and Ranging (LIDAR) sensors, pressure sensors, wearable sensors, haptic sensors, or smart home appliances for detecting user location and/or activity. The sensors 301 provide various sensor data to the home entertainment system 301.

The sensor data is interpreted by the home entertainment system 110 and/or the content provider 114. Because the home entertainment system 110 may have much lower processing power than the content provider 114, computationally intensive sensor data interpretation may occur at the content provider 114. In some implementations, the home entertainment system 110 may perform rudimentary data interpretation locally, but send the sensor data for complex processing to the content provider 114 over the network 130.

The sensors 150 may be integrated to the media distribution device 110 or can be external to the media distribution device. Sensors 150 located external to the media distribution device 110 are connected the media distribution device 301 via a wired cable or via a wireless connection such as WiFi or BLUETOOTH®. The disclosure below in reference to FIG. 3 describes in more detail the sensors 150 for use with the media distribution device 110.

In some implementations, the content provider 140 may serve a large number of home entertainment systems. The content provider 140 provides a computing system configured to transmit media content to the home entertainment system 110 (as well as other home entertainment systems not shown). For example, content provider 140 may include a web-server, database, and/or application server configured to respond to requests for web pages and/or streaming media files received from the home entertainment system 110. The media content itself may be distributed from the content provider 140 or through broader content distribution networks.

For example, in some implementations, the content provider 140 may allow users to authenticate themselves to the content provider 140 (e.g., using a username and password or using voice, fingerprint, or facial recognition). Once a given user is authenticated, the user may receive suggestions for activities from the content provider 140. The home entertainment system 110 and/or content provider 140 may use relationships between user activities to generate a set of suggested activities and serve the set of activities to the user via the display 120. The home entertainment system 110 downloads from the content provider 140 and plays one of the suggested activities. In addition to generating the set of suggested activities, the content provider 140 may also use relationships and between user activities and activity history of the user to generate other activity suggestions and recommendations, to present on the home entertainment system 110. The disclosure below in reference to FIG. 3 describes in more detail the generation of suggested actions for users of the home entertainment device 110.

The content provider 140 can include any computing or processing device, such as for example, one or more computer servers. The content provider 140 can be a single device, multiple devices in one location, or multiple devices in multiple locations. The disclosure below in reference to FIG. 2 describes in more detail example content provider configurations.

Figure 2:
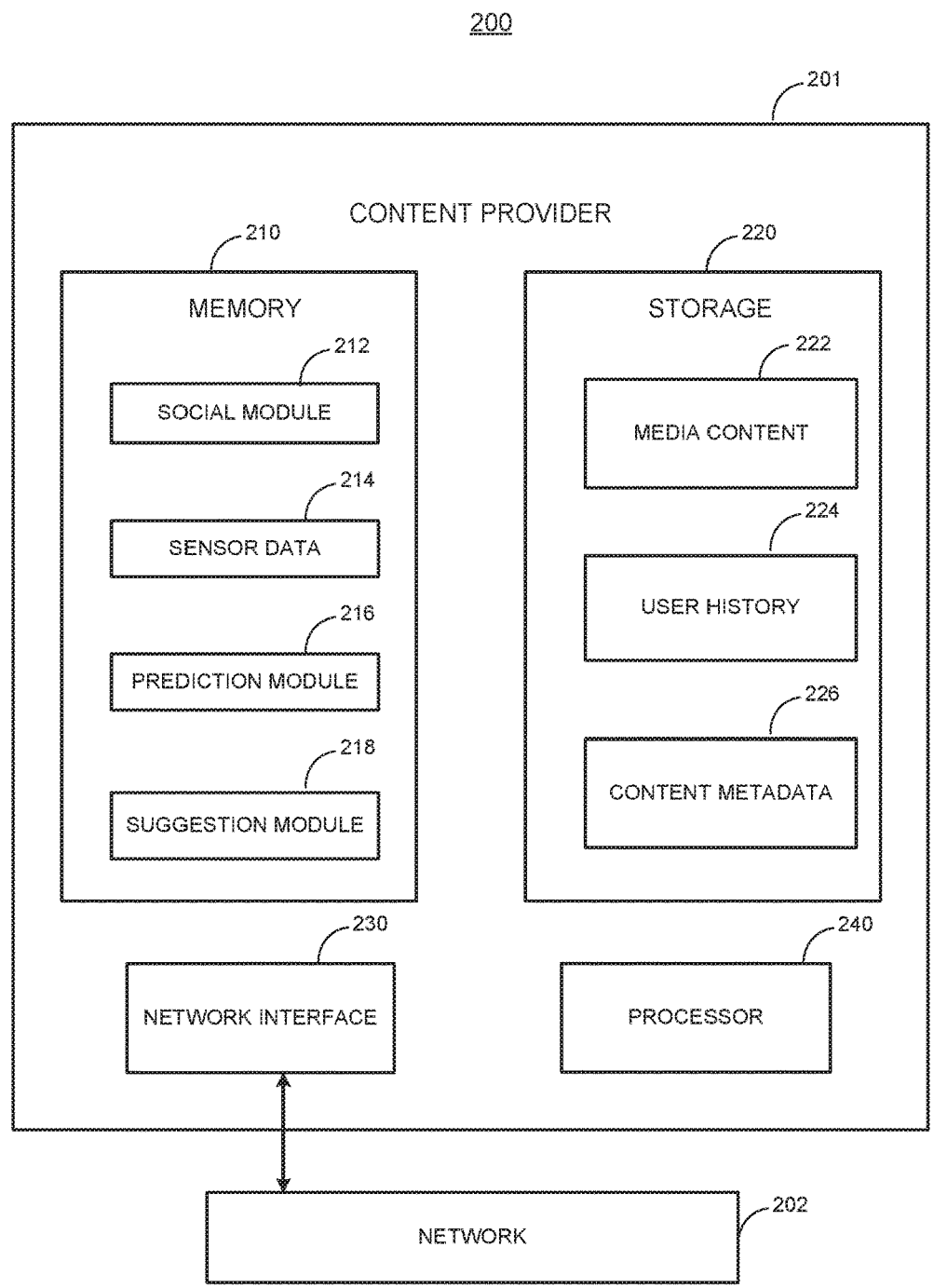
FIG. 2 illustrates a block diagram of an example content provider, according to one implementation of the invention.

FIG. 2 illustrates a block diagram 200 of an example content provider 201, according to one implementation of the invention. As shown, the content provider 201 includes a processor 240, a network interface 230, a memory 210, and a storage 220. The content provider 201 connects to a network 202.

The network 202 can include a wide area network (WAN) such as the Internet, or a local area network (LAN). The network 202 can include an intranet, a storage area network (SAN), a personal area network (PAN), a metropolitan area network (MAN), a wireless local area network (WLAN), a virtual private network (VPN), a cellular or other mobile communication network, a wireless local area networking (WiFi) network, a BLUETOOTH® wireless technology connection, a near field communication (NFC) connection, any combination thereof, and any other appropriate architecture or system that facilitates the communication of signals, data, and/or messages.

The processor 240 retrieves and executes programming instructions stored in the memory 210. Similarly, the processor 240 stores and retrieves application data residing in the memory 210. The processor 240 is included to be representative of a single CPU, multiple CPUs, a single CPU having multiple processing cores, and the like. And the memory 210 is generally included to be representative of a random access memory. The memory 210 can include any physical device used to temporarily or permanently store data or programs, such as various forms of random-access memory (RAM).

The memory 210 can include any physical device used to temporarily or permanently store data or programs, such as various forms of random-access memory (RAM). The storage 220 may be a disk drive storage device. Although shown as a single unit, the storage 220 may be a combination of fixed and/or removable storage devices, such as magnetic disc drives, solid state drives (SSD), removable memory cards, optical storage, network attached storage (NAS), or a storage area-network (SAN). The storage 220 can include any physical device for non-volatile data storage such as a HDD or a flash drive. The storage 220 can often have greater capacity than the memory 210 and can be more economical per unit of storage, but can also have slower data transfer rates.

Storage 230 includes media content 222, a user history 224, and content metadata 226. Media content 222 includes a library of media content available for download or streaming by a home entertainment system. Accordingly, the media content 222 may include a collection of audio/video/game data encoded at various bitrates and stored on the content provider 201. Alternatively, the media content 222 may include metadata describing the actual media files, which may be made available from a content distribution network. In some implementations the media server generates a license used by a client to obtain a given media content from the content distribution network.

The user history 224 is representative of one or more log entries which store user/session data, including data relating to activities undertaken by various users of a number of home entertainment systems. Such activities may include, e.g., playing a video game title, listening to a music track, viewing a media content, performing a search, viewing links, etc. The log entries may include, for example, a user identification (ID), media content played by the user, a timestamp of when the play started, and a timestamp of when the play ended. The log entries may include text of a search query entered by the user, and a timestamp of when the search query was received. The user history 224 may include user IDs of each user subscribing to the streaming media service, and may also include usernames, password data, user preferences and settings, and other user information.

The content metadata 226 in the storage 220 may include media content rollups, whether media content are available at various times, and other information relating to media content. As discussed in greater detail below, the user history 224 and content metadata 226 may be used to identify relationships between user activities and generate activity suggestions. For example, the user history 224 and content metadata 226 may be used to predict user behavior and preferences based on relationships between media content and searches of queries. The content provider 201 can use the predicted user behavior and preferences, either alone or in combination with other data, to generate activity recommendations and the like.

The memory 210 includes a social module 212, sensor data 214, a prediction module 216, and a suggestion module 218.

The social module 212 is an application that determines possible social interactions for multiple users of one or more home entertainment systems. In some implementations, the social module 212 analyzes calendar schedules, historical activity, preferences, and interests for a group of users to determine possible social activities between the group of users. The group of users may be friends or acquaintances on a social network. The group of users may also be strangers and have no prior social interactions. The social module 212 may predict which group of users may have the best probability of compatibility and therefore have increased engagement with their home entertainment systems. For example, the social module 212 may determine that two specific users are friends on a social network and both enjoy playing first person shooter games on weeknights, and therefore group those two specific users together. In another example, the social module 212 may determine that three users are in a vicinity of a single home entertainment device and group the three users together.

The sensor data 214 is received from the home entertainment system over the network 202. The sensor data 214 is interpreted by the home entertainment system and/or the content provider 201. Because the home entertainment system may have much lower processing power than the content provider 201, computationally intensive sensor data interpretation may occur at the content provider 201. In some implementations, the home entertainment system may perform rudimentary data interpretation locally, but send the sensor data for complex processing to the content provider 201 over the network 202.

The prediction module 216 is an application that predicts future user activities. The prediction module 216 may analyzes chat messages, calendar schedules, historical activity, preferences, and interests for a user of a home entertainment system to determine what the future user activities are likely. For example, the prediction module 216 may determine that a specific user typically engages with the home entertainment system until 8 pm each night before a work day. The prediction module 216 may then determine that the user has a holiday tomorrow (from analysis of an calendar application for the user) and predict that the user will engage with the home entertainment system until 10 pm in this case.

The suggestion module 218 is an application that analyzes the social interactions from the social module 212, the sensor data 214, user activity history, and the future user activity predictions from the prediction module 216 to determine one or more suggested activities for continued user engagement with the home entertainment system. Example suggested activities can be for a first user of a first home entertainment system to play a role-playing game from 5 pm until 7 pm, then watch a feature film from 7 pm to 9 pm with a second user when the second user of the first home entertainment system enters the room. The suggested activities can then be for the first user of the first home entertainment system to play a first person shooter multiplayer game online with a friend (e.g., a friend of the first user on a social network playing on a second home entertainment system).

Figure 3:
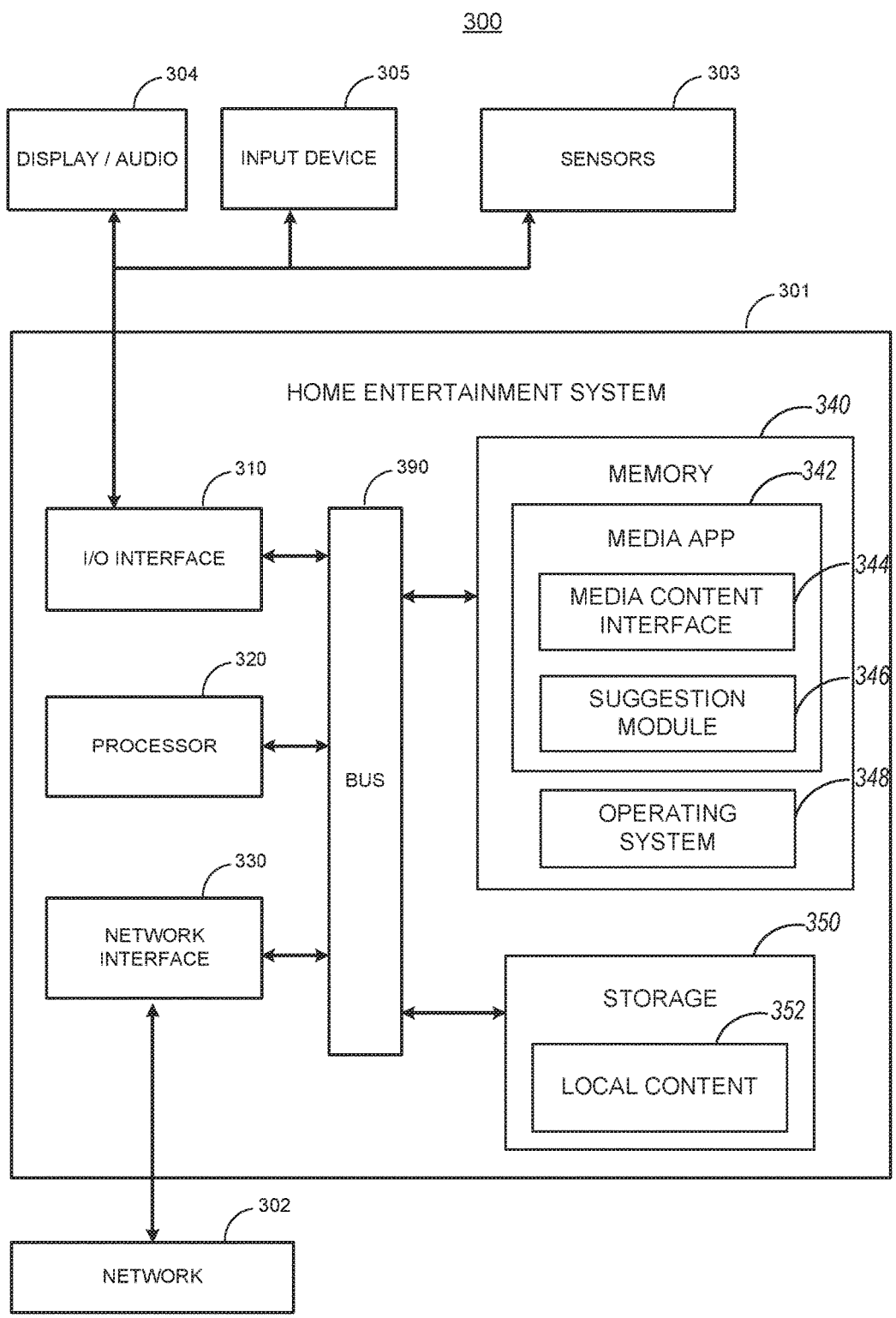
FIG. 3 illustrates a block diagram of an example home entertainment system, according to one implementation of the invention.

FIG. 3 illustrates a block diagram 300 of an example home entertainment system 301, according to one implementation of the invention. As shown, the home entertainment system 301 includes, without limitation, an I/O interface 310 a processor 320, a network interface 330, a bus 390, a memory 340, and a storage 350. The bus 390 connects the I/O interface 310, the processor 320, the network interface 330, the memory 340, and the storage 350.

The I/O interface 310 connects I/O devices to the home entertainment system 301. For example, I/O devices include input devices 305 such as a keyboard, mouse, or remote control. A user of the home entertainment system 301 can use one of the input devices 305 to enter various commands.

Example display/audio devices 304 include a monitor, television, tablet, or smartphone with a liquid crystal display (LCD), light-emitting diode (LED), or organic light-emitting diode (OLED) panel, etc. The home entertainment system 301 can output media content on the display/audio devices 304 for the user to enjoy.

The network interface 350 is configured to transmit data to and from network 302, such as for example, to download media content from and/or transmit sensor data to the server system 105.

The processor 320 can include single central processing unit (CPU), multiple CPUs, a single CPU having multiple processing cores, etc. For example, the processor can 320 be a chip on a motherboard that can retrieve and execute programming instructions stored in the memory 340.

One or more sensors devices 303 are connected to or integrate into the home entertainment system 301. The sensors 303 can include, for example, cameras, microphones, radars, Light Detection and Ranging (LIDAR) sensors, pressure sensors, wearable sensors, haptic sensors, or smart home appliances for detecting user location and/or activity. The sensors 301 provide various sensor data to the home entertainment system 301.

The sensor data is interpreted by the home entertainment system 301 and/or the content provider. Because the home entertainment system 301 may have much lower processing power than the content provider, computationally intensive sensor data interpretation may occur at the content provider. In some implementations, the home entertainment system 301 may perform rudimentary data interpretation locally, but send the sensor data for complex processing to the content provider over the network 302.

For example, cameras can provide sensor data that allows the home entertainment system 301 to determine a variety of information about users and their environment. In some implementations, one or more of various image processing and/or machine vision algorithms known in the art can be used to interpret the sensor data from the cameras. For example, the home entertainment system 301 can determine from the sensor data how many users are in a room, if any, and their user identity. The home entertainment system 301 can determine from the sensor data what activities one or more users in the room are engaged in, such as for example, resting on couch, eating a meal, in conversation, etc. In another example, the home entertainment system 301 can determine from the sensor data facial expressions and moods of the users. For example, the home entertainment system 301 can determine the mood of a user if the sensor data shows that the user is smiling or frowning. In another example, the home entertainment system 301 can determine from the sensor data how many users in the vicinity of the home entertainment system 310 are available to engage in a social activity.

Audio sensors such as microphones can provide sensor data that allows the home entertainment system 301 to determine a variety of information about users and their environment. One or more of various speech and sound processing algorithms known in the art can be used to interpret the sensor data from the microphones. For example, the home entertainment system 301 can determine from the sensor data voice commands. The audio sensors can also allow the home entertainment system 301 to passively receive sensor data for determining user preferences, behavior patterns, moods, schedules, etc. For example, the home entertainment system 110 can determine the mood of a user based on voice tonality and/or positive (e.g., "I like this song") or negative (e.g., "what else is on TV?") speech. For example, the home entertainment system 301 can determine the schedule of a user based on speed (e.g., "I have a doctor's appointment tomorrow morning at 8 am" or "I need to get to bed in an hour").

Wearable and haptic sensors can provide sensor data that allows the home entertainment system 301 to determine user health and other body status information. For example, a smart watch can provide sensor data to the home entertainment system 110 for heart rate of a user.

The sensors 303 may be integrated to the home entertainment system 301 or can be external to the home entertainment system. Sensors 303 located external to the home entertainment system 301 are connected the home entertainment system 301 via a wired cable or via a wireless connection such as WiFi or BLUETOOTH®.

The memory 340 can include any physical device used to temporarily or permanently store data or programs, such as various forms of random-access memory (RAM). The storage 350 may be a disk drive storage device. Although shown as a single unit, the storage 350 may be a combination of fixed and/or removable storage devices, such as magnetic disc drives, solid state drives (SSD), removable memory cards, optical storage, network attached storage (NAS), or a storage area-network (SAN). The storage 350 can include any physical device for non-volatile data storage such as a HDD or a flash drive. The storage 350 can often have greater capacity than the memory 340 and can be more economical per unit of storage, but can also have slower data transfer rates.

Storage 330, such as a hard disk drive or solid-state (SSD) storage drive, may store media content 352 locally on the home entertainment system such as files for an operating system, applications, games, videos, audio, user preferences, logs, and any other data.

The memory 340 stores data to be conveniently accessed by the processor 320 such as an operating system 348 and media applications 342. The operating system 348 is system software that manages computer hardware and software resources and provides common services for computer programs.

The media applications 342 can include a media content interface 344. The media content interface 344 is a software application that allows a user to access, browse, search, and play media content such as movies, videos, music, games, social applications, etc. The media content may be locally available on the storage 350 of the home entertainment system 301 or be available over the network 302 (e.g., stored at a content provider or a peer home entertainment system).

In some implementations, the media content interface 344 may permit a user to enter search queries for transmission to the content provider via the network 302. Content found and downloaded from the content provider or a peer home entertainment system may be stored in storage 350 as buffered media content prior to being decoded and played by the media content interface 344.

The media applications 342 can include a suggestion module 346. The suggestion module 346 is an application that analyzes the social interactions, sensor data from the sensors 303, user activity history, and the future user activity predictions to determine one or more suggested activities for continued user engagement with the home entertainment system. Example suggested activities can be for a first user of a first home entertainment system to play a role-playing game from 5 pm until 7 pm, and then watch a feature film from 7 pm to 9 pm with a second user when the second user of the first home entertainment system enters the room. The suggested activities can be for the first user of the first home entertainment system to play a first person shooter multiplayer game online with a friend (e.g., a friend of the first user on a social network playing on a second home entertainment system).

In some implementations, the suggestion module 346 may determine when a user of the home entertainment system is likely to disengage from active participation with the apparatus, based on the usage history, and generate a suggested activity that starts at or before the disengagement time. The suggestion module 346 may determine that a user of the home entertainment system 301 will typically go to bed at 11 pm each night and will suggest media content that starts before 11 pm.

Figure 4:
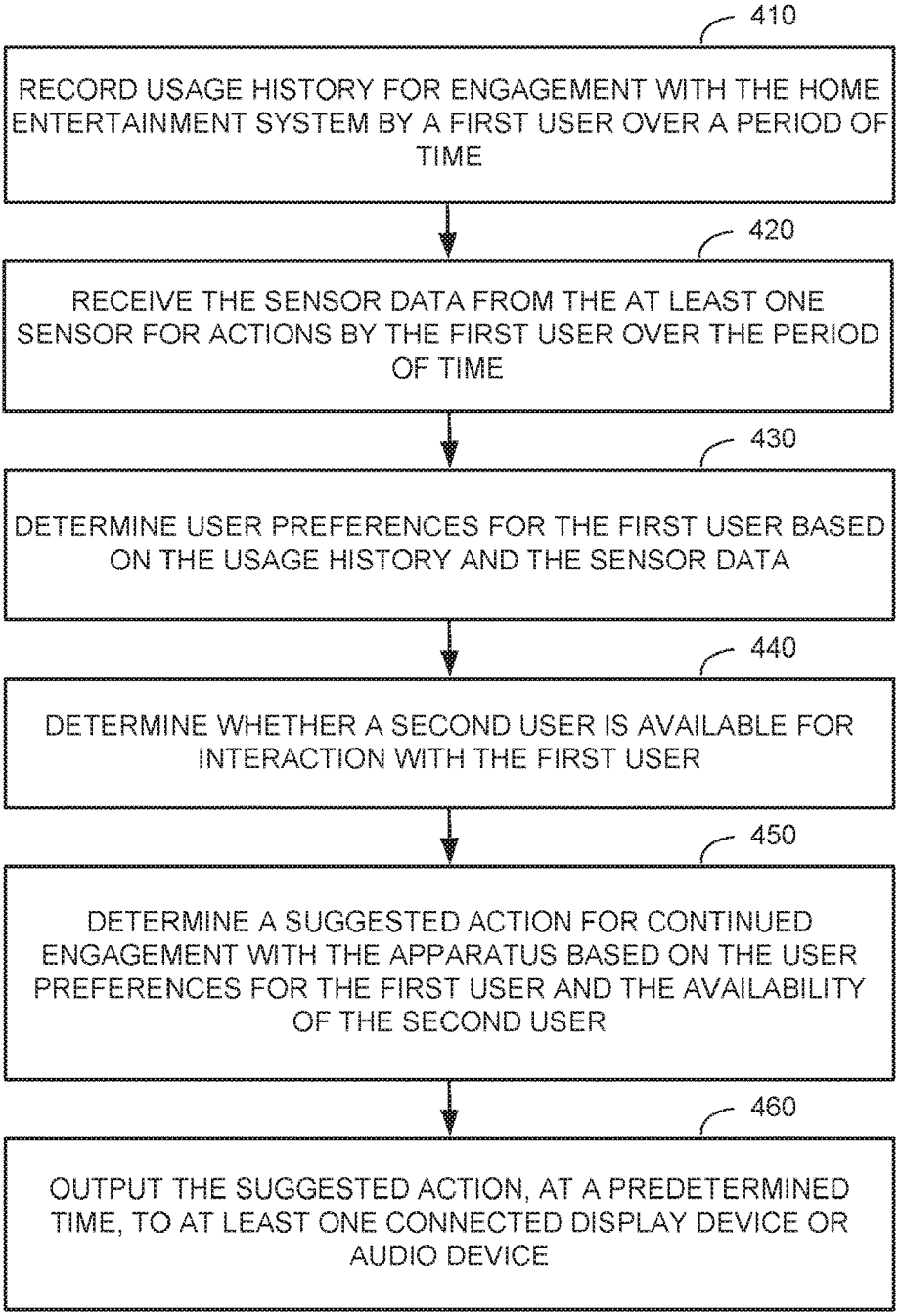
FIG. 4 illustrates an example methodology for providing community driven content by a home entertainment system.

FIG. 4 illustrates an example methodology 400 for providing community driven content by a home entertainment system. At step 410, the home entertainment system records usage history for engagement with the apparatus by a first user over a period of time.

At step 420, the home entertainment system receives the sensor data from the at least one sensor for actions by the first user over the period of time. In some implementations, the at least one sensor includes at least one of a microphone or a camera. the at least one sensor can include at least one of a wearable sensor or a haptic sensor.

At step 430, the home entertainment system determines user preferences for the first user based on the usage history and the sensor data. In some implementations, the user preferences is based on sensor data from a camera for facial expressions of the first user. The user preferences can be based on sensor data from a microphone for positive or negative voice reactions of the first user.

At step 440, the home entertainment system determines whether a second user is available for interaction with the first user.

At step 450, the home entertainment system determines a suggested action for continued engagement with the apparatus based on the user preferences for the first user and the availability of the second user. In some implementations, the suggested action is additionally based on user preferences for the second user.

At step 450, the home entertainment system outputs the suggested action, at a predetermined time, to at least one connected display device or audio device.

In some implementations, the home entertainment system further determines a disengagement time when the user is predicted to disengage from active participation with the apparatus, based on the usage history. The predetermined time can be at or before the disengagement time.

In some implementations, the home entertainment system determines a schedule for the first user from at least one of an online social network, a personal calendar application, an electronic mail application, chat application, or text application of the first user, where the suggested action is additionally based on the schedule.

Figure 5:
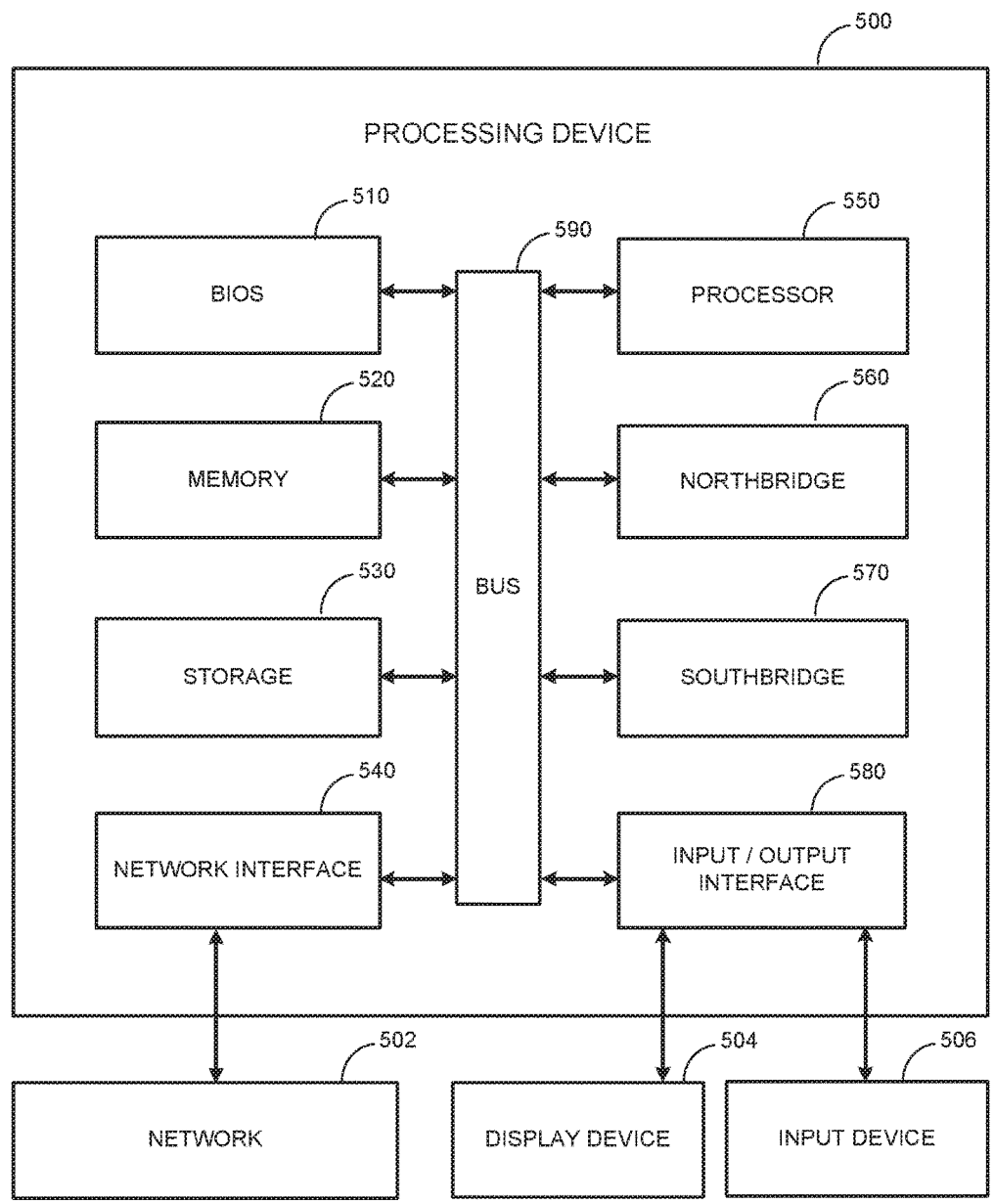
FIG. 5 illustrates a block diagram of an example processing device.

FIG. 5 illustrates a block diagram of an example processing device 500. The processing device 500 can include a Basic Input/Output System (BIOS) 510, a memory 520, a storage 530, a network interface 540, a processor 550, a northbridge 560, a southbridge 570, and an input/output (IO) interface 580.

The processing device 500 can be any apparatus for processing data, such as for example, a server computer (e.g., one of many rack servers in a data center), a personal computer, a laptop computer, a smartphone, a tablet, an entertainment console, a wearable device, or a set top box. The processor (e.g., central processing unit (CPU)) 550 can be a chip on a motherboard that can retrieve and execute programming instructions stored in the memory 520. The processor 550 can be a single CPU with a single processing core, a single CPU with multiple processing cores, or multiple CPUs. One or more buses 590 can transmit instructions and application data between various computer components such as the processor 550, memory 520, storage 530, and networking interface 540.

The memory 520 can include any physical device used to temporarily or permanently store data or programs, such as various forms of random-access memory (RAM). The storage 530 can include any physical device for non-volatile data storage such as a HDD or a flash drive. The storage 530 can often have greater capacity than the memory 520 and can be more economical per unit of storage, but can also have slower data transfer rates.

The BIOS 510 can include a Basic Input/Output System or its successors or equivalents, such as an Extensible Firmware Interface (EFI) or Unified Extensible Firmware Interface (UEFI). The BIOS 510 can include a BIOS chip located on a motherboard of the processing device 500 storing a BIOS software program. The BIOS 510 can store firmware executed when the computer system is first powered on along with a set of configurations specified for the BIOS 510. The BIOS firmware and BIOS configurations can be stored in a non-volatile memory (e.g., NVRAM) 512 or a ROM such as flash memory. Flash memory is a non-volatile computer storage medium that can be electronically erased and reprogrammed.

The BIOS 510 can be loaded and executed as a sequence program each time the processing device 500 is started. The BIOS 510 can recognize, initialize, and test hardware present in a given computing system based on the set of configurations. The BIOS 510 can perform self-test, such as a Power-on-Self-Test (POST), on the processing device 500. This self-test can test functionality of various hardware components such as hard disk drives, optical reading devices, cooling devices, memory modules, expansion cards and the like. The BIOS can address and allocate an area in the memory 520 in to store an operating system. The BIOS 510 can then give control of the computer system to the OS.

The BIOS 510 of the processing device 500 can include a BIOS configuration that defines how the BIOS 510 controls various hardware components in the processing device 500. The BIOS configuration can determine the order in which the various hardware components in the processing device 500 are started. The BIOS 510 can provide an interface (e.g., BIOS setup utility) that allows a variety of different parameters to be set, which can be different from parameters in a BIOS default configuration. For example, a user (e.g., an administrator) can use the BIOS 510 to specify clock and bus speeds, specify what peripherals are attached to the computer system, specify monitoring of health (e.g., fan speeds and CPU temperature limits), and specify a variety of other parameters that affect overall performance and power usage of the computer system.

The I/O interface 580 allows the processing device 500 to connect with I/O devices such as a keyboard, a mouse, a remote control, a controller, a microphone, a television, a head mounted display (HMD), and/or a monitor, etc.

The northbridge 560 can be a chip on the motherboard that can be directly connected to the processor 550 or can be integrated into the processor 550. In some instances, the northbridge 560 and the southbridge 570 can be combined into a single die. The northbridge 560 and the southbridge 570, manage communications between the processor 550 and other parts of the motherboard. The northbridge 560 can manage tasks that require higher performance than the southbridge 570. The northbridge 560 can manage communications between the processor 550, the memory 520, and video controllers (not shown). In some instances, the northbridge 560 can include a video controller.

The southbridge 570 can be a chip on the motherboard connected to the northbridge 560, but unlike the northbridge 560, is not directly connected to the processor 550. The southbridge 570 can manage input/output functions (e.g., audio functions, BIOS, Universal Serial Bus (USB), Serial Advanced Technology Attachment (SATA), Peripheral Component Interconnect (PCI) bus, PCI eXtended (PCI-X) bus, PCI Express bus, Industry Standard Architecture (ISA) bus, Serial Peripheral Interface (SPI) bus, Enhanced Serial Peripheral Interface (eSPI) bus, System Management Bus (SMBus), etc.) of the processing device 500. The southbridge 570 can be connected to or can include within the southbridge 570 the I/O interface 570, Direct Memory Access (DMAs) controllers, Programmable Interrupt Controllers (PICs), and a real-time clock.

The input device 502 can be at least one of a game controller, a joystick, a mouse, a keyboard, a touchscreen, a trackpad, or other similar control device. The input device 502 allows a user to provide input data to the processing device 500.

The display device 504 can be at least one of a monitor, a light-emitting display (LED) screen, a liquid crystal display (LCD) screen, a head mounted display (HMD), a virtual reality (VR) display, a augmented reality (AR) display, or other such output device. The display device 504 allows the processing device 500 to output visual information to a user.

The various illustrative logical blocks, modules, and circuits described in connection with the disclosure herein can be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The operations of a method or algorithm described in connection with the disclosure herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

In one or more exemplary designs, the functions described can be implemented in hardware, software, firmware, or any combination thereof. If implemented in software, the functions can be stored on or transmitted over as one or more instructions or code on a non-transitory computer-readable medium. Non-transitory computer-readable media includes both computer storage media and communication media including any medium that facilitates transfer of a computer program from one place to another. A storage media can be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blue ray disc where disks usually reproduce data magnetically, while discs reproduce data optically with lasers. Combinations of the above should also be included within the scope of non-transitory computer-readable media.

The previous description of the disclosure is provided to enable any person skilled in the art to make or use the disclosure. Various modifications to the disclosure will be readily apparent to those skilled in the art, and the generic principles defined herein can be applied to other variations without departing from the scope of the disclosure. Thus, the disclosure is not intended to be limited to the examples and designs described herein, but is to be accorded the widest scope consistent with the principles and novel features disclosed herein.

What is claimed is:

1. An apparatus for providing community driven content, the apparatus comprising:
    at least one sensor that captures sensor data, wherein the at least one sensor includes a camera that captures an image of an environment;
    a network interface;
    a memory; and
    a processor connected to the sensor, the network interface, and the memory, wherein the processor executes instructions to:
        identify a number of users that are present in the environment based on the captured image, wherein the number of users includes at least a first user,
        determine an identity of the first user based on the captured image,
        record usage history for engagement with one or more types of content by the first user over a period of time,
        predict one or more user preferences for the first user based on the usage history recorded for the first user,
        determine that a second user is available for interaction with the first user when the sensor data indicates that the second user is within a predetermined vicinity of the first user, wherein the sensor data further indicates an identity of the second user,
        determine user preferences for the second user based on the second user identity,
        determine a suggested action for continued engagement with the one or more types of content based on the user preferences for the first user and the user preferences of the second user determined to be available,
        determine a disengagement time when the first user is predicted to disengage from active participation with the one or more types of content based on the recorded usage history, and
        output the suggested action at a predetermined time to at least one connected display device or audio device, wherein the predetermined time is at or before the disengagement time.

2. The apparatus of claim 1, wherein the at least one sensor further comprises a microphone.

3. The apparatus of claim 1, wherein the at least one sensor further comprises at least one of a wearable sensor or a haptic sensor.

4. The apparatus of claim 1, wherein the processor executes further instructions to identify the second user as available based on the second user being available on a remotely connected apparatus.

5. The apparatus of claim 1, wherein the processor executes further instructions to determine a schedule for the first user from at least one of an online social network, a personal calendar application, an electronic mail application, chat application, or text application of the first user, wherein the suggested action is additionally based on the schedule.

6. The apparatus of claim 1, wherein the image captured by the camera includes one or more facial expressions of the first user.

7. The apparatus of claim 2, wherein the microphone captures positive or negative voice reactions of the first user.

8. A method for providing community driven content by a home entertainment system, the method comprising:
    recording usage history for engagement with one or more types of content by a first user over a period of time;
    receiving sensor data from at least one sensor for actions by the first user over the period of time, wherein the at least one sensor includes a camera that captures an image of an environment;
    identifying a number of users that are present in the environment based on the captured image, wherein the number of users includes the first user;
    predicting one or more user preferences for the first user based on the usage history recorded for the first user;
    determining that a second user is available for interaction with the first user when the sensor data indicates that the second user is within a predetermined vicinity of the first user, wherein the sensor data further indicates an identity of the second user;
    determining user preferences for the second user based on the second user identity;
    determining a suggested action for continued engagement with the one or more types of content based on the user preferences for the first user and the user preferences of the second user determined to be available;
    determining a disengagement time when the first user is predicted to disengage from active participation with the one or more types of content based on the recorded usage history; and
    outputting the suggested action at a predetermined time to at least one connected display device or audio device, wherein the predetermined time is at or before the disengagement time.

9. The method of claim 8, further comprising determining that the second user is available based on the second user being available on a remotely connected apparatus.

10. The method of claim 8, further comprising determining a schedule for the first user from at least one of an online social network, a personal calendar application, an electronic mail application, chat application, or text application of the first user, wherein the suggested action is additionally based on the schedule.

11. The method of claim 8, wherein the image captured by the camera includes one or more facial expressions of the first user.

12. The method of claim 8, wherein the sensor includes a microphone that captures positive or negative voice reactions of the first user.

\* \* \* \* \*